N. HEGER.
BELT HOOK.
APPLICATION FILED DEC. 16, 1911.
1,035,963.
Patented Aug. 20, 1912.
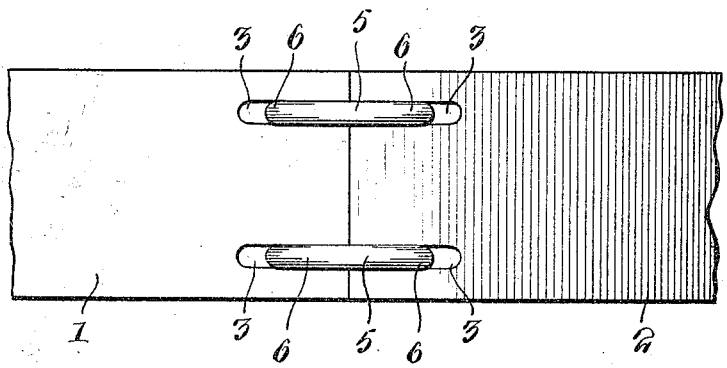
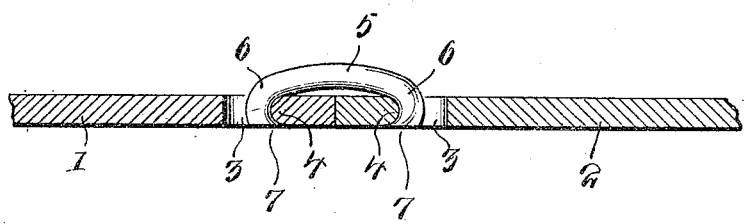
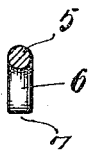
WITNESSES:
INVENTOR:
Norbert Heger
BY
Attorney

UNITED STATES PATENT OFFICE.

NORBERT HEGER, OF DENVER, COLORADO.

BELT-HOOK.

1,035,963.  Specification of Letters Patent.  Patented Aug. 20, 1912.

Application filed December 16, 1911. Serial No. 666,147.

*To all whom it may concern:*

Be it known that I, NORBERT HEGER, a citizen of the United States, residing at Denver, in the county of Denver and State of Colorado, have invented certain new and useful Improvements in Belt-Hooks, of which the following is a specification.

This invention relates to drive or conveyer belt hooks or couplings, the object of the invention being to provide a simple, reliable and inexpensive construction of coupling hooks whereby the ends or sections of a belt may be coupled against casual disconnection and at the same time permitted to have free relative movement so as to run easily and smoothly around large or small pulleys.

A further object of the invention is to provide a hook which may be attached and detached without the use of special tools, and without the use of special devices to form the receiving openings therefor in the belt, and which, in addition to properly distributing the imposed strains, will roll easily around the pulleys without the thumping and other objectionable noises caused by belt couplings of ordinary construction.

The invention consists of the features of construction, combination and arrangement of parts, hereinafter fully described and claimed; reference being had to the accompanying drawings, in which:—

Figure 1 is a top plan view of the meeting ends of a belt connected by coupling hooks embodying my invention. Fig. 2 is a vertical longitudinal section through the same in the plane of one of the hooks. Fig. 3 is a cross section through one of the hooks.

Referring to the drawings, 1 and 2 designate meeting ends of a belt or belt sections provided with longitudinally alined pairs of oblong openings 3, the relatively inner end walls 4 of which are preferably curved on arcs of true circles. These openings are arranged in proper proximity to the end edges of the belt or belt sections, and may each be formed, if desired, by simply punching a pair of round intersecting holes in the belt by means of an ordinary punch.

The ends 1 and 2 are connected by coupling members, each comprising a body portion 5 having hooked ends 6 to engage the openings 3. If the belt is comparatively narrow the use of two coupling members of the type disclosed may be found sufficient, in which event the said coupling members will be arranged on opposite sides of the longitudinal center of the belt and at suitable distances between the same and the respective side edges of the belt. In coupling the ends or sections of wide belts a required number of coupling members to equally distribute the pulling strain across the belt will be employed.

The body portion 5 of each coupling member extends longitudinally of the belt and is longitudinally curved and preferably of circular form in cross section, the concaved side of said body portion being arranged to face the outer side of the belt. The hooked ends 6 are turned inward and project into the coacting openings 3 and preferably have partially circular inner faces conforming to and engaging the walls 4. As shown, the hooked ends taper in the direction of length of the coupling member to facilitate their insertion into and withdrawal from the openings and their inner faces 7 are flat to lie flush with the inner side of the belt.

In practice, the coupling members are preferably formed of hardened steel wire and may, therefore, be easily, rapidly and economically manufactured, and the distance between the curved faces of the hooks coincides or substantially coincides with the distance between the inner walls of the openings, so that the coupling members when applied will hold the ends of the belt in contact, thus preventing relative outward longitudinal movement thereof, whereby all possibility of casual disengagement of the coupling members will be avoided. This construction, however, permits the coupling members to be easily applied and removed without the use of special tools by simply flexing the belt at an angle to the plane of the coupling members, as will be readily understood.

It will be observed that the concaved faces of the body portions of the coupling members are slightly spaced from the outer face of the belt. As a result of this construction the hooks are permitted to have movement in the openings 3 and the ends of the belt are adapted to pivot on the curved faces of the hooks and flex in and out of the said spaces formed by said concaved faces of the coupling members, thus allowing the coupled ends to have free movement around pulleys of various sizes and to conform to the contour thereof. Hence the coupled ends of the belt and coupling members may accommodate themselves to pulleys of different diameters and travel around the same in a smooth and noiseless manner and without undue strain on the belt or tearing out of the couplings. The rounded form of the body of each coupling member further permits the belt to roll easily as it goes around the pulley, thereby preventing the thumps and strains produced by ordinary fasteners and prolonging the life of the belt and the pulley bearings.

Of course, it will be understood that the couplings may be made of any suitable material, and that they may also be made of different sizes to suit belts of different widths and thicknesses.

Having thus described the invention, what I claim as new is:

A belt coupling comprising a longitudinally bowed or curved body of substantially circular form in cross section and having comparatively short and blunt inturned end hooks integral therewith, said hooks being bent on arcs eccentric to the center of the arc of curvature of the body and formed with inner arcuate bearing faces, the extremities of said hooks being cut away at an angle to provide flattened faces lying substantially parallel with a straight longitudinal line drawn through the center of the body.

In testimony whereof I affix my signature in presence of two witnesses.

NORBERT HEGER.

Witnesses:
 LOUIS F. NELL,
 L. B. HUNGERFORD.